United States Patent
Reczek et al.

(10) Patent No.: US 11,783,280 B2
(45) Date of Patent: Oct. 10, 2023

(54) SYSTEM AND METHOD FOR CARRIER SELECTION

(71) Applicant: PITT OHIO, Pittsburgh, PA (US)

(72) Inventors: Christina Marie Reczek, Carnegie, PA (US); Scott Walter Greacen, Wexford, PA (US)

(73) Assignee: PITT OHIO, Pittsburgh, PA (US)

(*) Notice: Subject to any disclaimer, the term of this patent is extended or adjusted under 35 U.S.C. 154(b) by 0 days.

(21) Appl. No.: 17/501,299

(22) Filed: Oct. 14, 2021

(65) Prior Publication Data
US 2023/0120374 A1    Apr. 20, 2023

(51) Int. Cl.
*G06Q 10/08* (2023.01)
*G06Q 10/0834* (2023.01)

(52) U.S. Cl.
CPC .............. *G06Q 10/0834* (2013.01)

(58) Field of Classification Search
CPC .............. G06Q 10/0834; G06Q 10/08
See application file for complete search history.

(56) References Cited

U.S. PATENT DOCUMENTS

| | | | |
|---|---|---|---|
| 7,765,120 B2 | 7/2010 | Yadappanavar et al. | |
| 8,572,001 B2 | 10/2013 | Hollis | |
| 10,740,716 B1* | 8/2020 | Souliotis | G06Q 10/0836 |
| 2014/0149321 A1 | 5/2014 | Laumanns et al. | |
| 2016/0300186 A1 | 10/2016 | Scharaswak et al. | |
| 2019/0213500 A1 | 7/2019 | Chowdhary et al. | |
| 2019/0296895 A1* | 9/2019 | Banks | H04L 9/3226 |
| 2020/0357089 A1 | 11/2020 | Mohr et al. | |
| 2021/0073734 A1 | 3/2021 | Aman et al. | |
| 2021/0133655 A1 | 5/2021 | Suemitsu et al. | |
| 2021/0334748 A1* | 10/2021 | Horesh | G06N 20/00 |

(Continued)

FOREIGN PATENT DOCUMENTS

WO    2014178055    11/2014

OTHER PUBLICATIONS

Thomas, Eoin, et al. "Cascaded machine learning model for efficient hotel recommendations from air travel bookings." Proceedings of Proceedings of the 12th ACM Conference on Recommender Systems, ACM RecSys Workshop on Recommenders in Tourism (RecTour2019 vol. 2435). (Year: 2019).*

(Continued)

*Primary Examiner* — Scott M Tungate
(74) *Attorney, Agent, or Firm* — CALDWELL INTELLECTUAL PROPERTY LAW

(57) ABSTRACT

In an aspect, a system for carrier selection is presented. A system includes a computing device. A computing device is configured to receive a transport request from an external computing device. A transport request includes transport parameters conveyed to a computing device. A computing device is configured to receive at least a carrier datum from a carrier database. At least a carrier datum corresponds to at least a carrier of a plurality of carriers. A computing device is configured to identify a carrier of a plurality of carriers as a function of a transport request and at least a carrier datum. A computing device is configured to generate a carrier optimization model as a function of a transport request. A computing device is configured to provide a carrier selection as a function of a carrier optimization model and an identified carrier.

20 Claims, 6 Drawing Sheets

(56) References Cited

U.S. PATENT DOCUMENTS

2022/0004985 A1* 1/2022 Neumann .......... G01C 21/3691
2023/0075894 A1* 3/2023 Walters .............. H04L 41/0893

OTHER PUBLICATIONS

Allen, J., Bektas, T., Cherrett, T., Friday, A., McLeod, F., Piecyk, M., Piotrowska, M. and Zaltz Austwick, M., Enabling the freight traffic controller for collaborative multi-drop urban logistics: practical and theoretical challenges, Dec. 31, 2017.

* cited by examiner

SYSTEM AND METHOD FOR CARRIER SELECTION

FIELD OF THE INVENTION

The present invention generally relates to the field of supply chain management. In particular, the present invention relates to a system for carrier identification selection for transportation.

BACKGROUND

Modern supply chain systems usually have a plurality of carriers involved in a transportation of a transport component. A plurality of carriers may have a plurality of variables to account for such as cost, availability, efficiency, and the like. Modern carrier selection systems usually do not take into account all variables for selection criteria and thus can be improved.

SUMMARY OF THE DISCLOSURE

In an aspect, a system for carrier selection is presented. A system includes a computing device. A computing device is configured to receive a transport request from an external computing device. A transport request includes transport parameters conveyed to a computing device. A computing device is configured to receive at least a carrier datum from a carrier database. At least a carrier datum corresponds to at least a carrier of a plurality of carriers. A computing device is configured to identify a carrier of a plurality of carriers as a function of a transport request and at least a carrier datum. A computing device is configured to generate a carrier optimization model as a function of a transport request. A computing device is configured to provide a carrier selection as a function of a carrier optimization model and an identified carrier.

In an aspect, a method of selecting a carrier is presented. A method includes receiving at a computing device a transport request from an external computing device. A method includes receiving, from a carrier database, at least a carrier datum corresponding to at least a carrier of a plurality of carriers. A method includes identifying at a computing device a carrier of a plurality of carriers of a carrier database as a function of a transport request. A method includes generating at a computing device a carrier optimization model as a function of a transport request. A method includes providing a carrier selection as a function of a carrier optimization model and an identified carrier of a plurality of carriers.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims.

Described herein is a system for carrier selection. A may include a computing device. A computing device may be configured to receive a transport request from an external computing device. A transport request may include transport parameters conveyed to a computing device. A computing device may be configured to receive at least a carrier datum from a carrier database. At least a carrier datum may correspond to at least a carrier of a plurality of carriers. A computing device may be configured to identify a carrier of a plurality of carriers as a function of a transport request and at least a carrier datum. A computing device may be configured to generate a carrier optimization model as a function of a transport request. A computing device may be configured to provide a carrier selection as a function of a carrier optimization model and an identified carrier.

Described herein is a method of selecting a carrier. A method may include receiving at a computing device a transport request from an external computing device. A method may include receiving, from a carrier database, at least a carrier datum corresponding to at least a carrier of a plurality of carriers. A method may include identifying at a computing device a carrier of a plurality of carriers of a carrier database as a function of a transport request. A method may include generating at a computing device a carrier optimization model as a function of a transport request. A method may include providing a carrier selection as a function of a carrier optimization model and an identified carrier of a plurality of carriers.

Figure 1:
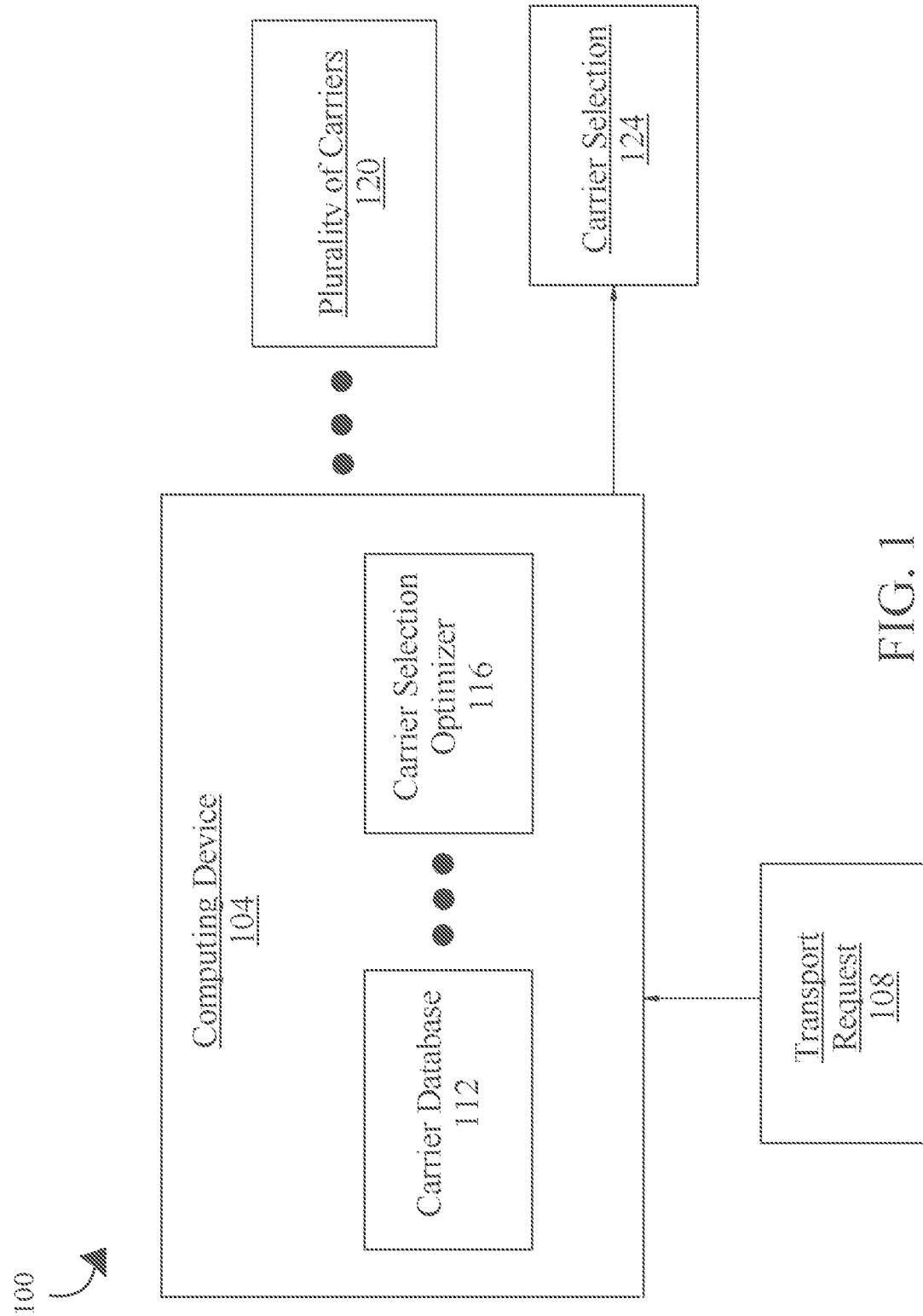
FIG. 1 is a block diagram of a system for carrier selection.

Referring now to FIG. 1, a system 100 for carrier selection is presented. System 100 may include computing device 104. Computing device 104 may be utilized for connecting a computing device to one or more of a variety of networks, and one or more devices. Computing device 104 may include, but is not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. Computing device 104 may employ a wired and/or a wireless mode of communication. In general, any network topology may be used. Information (e.g., data, software etc.) may be communicated to and/or from a computer and/or a computing device through computing device 104. Computing device 104 may include but is not limited to, for example, a computing device or cluster of computing devices in a first location and a second computing device or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device, which may operate in parallel, in series, redundantly, or in any other manner used for distribution of tasks or memory between computing devices. Computing device 104 may be implemented using a "shared nothing" architecture in which data is cached at the worker, in an embodiment, this may enable scalability of system 100 and/or computing device 104.

With continued reference to FIG. 1, computing device 104 may include a computing device that may be designed and/or configured to perform any method, method step, or sequence of method steps in any embodiment described in this disclosure, in any order and with any degree of repetition. For instance, a computing device of computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device of computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, computing device 104 may be configured to receive transport request 108. A "transport request" as used in this disclosure is a request for transporting one or more components from one location to at least another location. In some embodiments, transport request 108 may be transmitted digitally to computing device 104. In some embodiments, computing device 104 may be configured to receive a plurality of transport requests 108. In some embodiments, transport request 108 may be entered manually by a user into computing device 104. Transport request 108 may include a set of transport parameters. A "transport parameter" as used in this disclosure is a datum relating to a transportation of a component. In some embodiments, transport request 108 may include transport parameters such as, but not limited to, a type of component, transport times, transport destinations, transport dates, transport priority, transport cost, and the like. In some embodiments, a type of component may include a category of component. Examples of categories may include, but are not limited to, food, construction materials, electronics, furniture, consumer goods, industrial materials, and the like. In some embodiments, a type of component may include, but is not limited to, an individual component, a bulk group of components, a component size, and the like. In some embodiments, a type of component may include component dimensions, such as, but not limited to, height, width, length, thickness, volume, and the like. In some embodiments, a type of component may include a component weight which may be measured in kilograms (kg), pounds (lbs), ounces (oz), grams (g), and the like. In some embodiments, transport parameters of transport request 108 may include a type of transport. A type of transport may include, but is not limited to, ground, air, sea, expedited, freight, and the like. In some embodiments, transport parameters of transport request 108 may include transport preferences. Transport preferences may include, but are not limited to, carrier type, carrier company, preferred costs, preferred delivery times, and the like. In some embodiments, transport request 108 may include, but is not limited to, dates, time, locations, destinations, costs, and the like. In some embodiments, transport request 108 may convey transport parameters to computing device 104. In a non-limiting example, transport request 108 may convey transport parameters to computing device 104 detailing that an entity wants a shipment of 100 oranges in bulk transported to 34 Citrus Road, Boston, Mass., on Oct. 2, 2021, at 5:00 P.M.

Still referring to FIG. 1, computing device 104 may include carrier database 112. Carrier database 112 may be implemented, without limitation, as a relational database, a key-value retrieval database such as a NOSQL database, or any other format or structure for use as a database that a person skilled in the art would recognize as suitable upon review of the entirety of this disclosure. Carrier database 112 may alternatively or additionally be implemented using a distributed data storage protocol and/or data structure, such as a distributed hash table or the like. Carrier database may include a plurality of data entries and/or records as described above. Data entries in carrier database 112 may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

Still referring to FIG. 1, in some embodiments, carrier database 112 may include a carrier datum. A "Carrier datum" as used in this disclosure is an element of information pertaining to one or more carriers. Carrier database 112 may include data of plurality of carriers 120. A "carrier" as used in this disclosure is an entity that transports an object between locations. An entity may include, but is not limited to, an individual, a vehicle, a group of individuals, a group of vehicles, and the like. Carrier database 112 may include data regarding a carrier type. A carrier type may include, but is not limited to, a terrestrial carrier, an aerial carrier, and/or an aquatic carrier. In some embodiments, a carrier type may include but is not limited to, a plane, a drone, a helicopter, a boat, a ship, a car, a truck, a motorcycle, and the like. In some embodiments, a carrier type may include a motorized carrier. In other embodiments, a carrier type may include a non-motorized carrier. In some embodiments, a non-motorized carrier may include, but is not limited to, a bicycle, a skateboard, a scooter, and the like. In a non-limiting example, carrier database 112 may include data of a carrier of plurality of carriers 120 showing one carrier may be utilizing a truck while another carrier may be utilizing a boat. In some embodiments, carrier database 112 may include a transport path of a carrier of plurality of carriers 120. A transport path of a carrier may include a path a carrier may take in the process of transporting a transport component. A transport path may include, but is not limited to, directions, estimated transport times, detour information, street addresses, and the like. In some embodiments, a transport path of a carrier of plurality of carriers 120 may include departure times, arrival times, fueling times, rest times, and the like. In some embodiments, a transport path of a carrier may include geographical coordinates, altitudes, longitudes, latitudes, and/or other locational datum. In some embodiments, a transport path may include a latitude, longitude, and/or altitude between two or more carriers. In some embodiments, carrier database 112 may include a plurality of transport paths of plurality of carriers 120. In some embodiments, carrier database 112 may include a location of a carrier of plurality of carriers 120. In some embodiments, a location of a carrier of a plurality of carriers 120 may be updated in real time. "Real time" as used in this disclosure is the actual time an action and/or event is occurring. A "transport component" as used in this disclosure is any object that is transported by one or more carriers. A transport component may include dimensions such as, but not limited to, height, length, width, thickness, volume, weight, and the like. In some embodiments, a transport component may belong to a transport component category. A transport component category may include categories such as, but not limited to, food, construction materials, electronics, consumer goods, vehicles, vehicle parts, furniture, and/or other categories. In some embodiments, a transport component may include a value. In some embodiments, carrier database 112 may include an estimated delivery cost of transporting a transport component. An estimated delivery cost may include a cost of transportation of a transport component. In some embodiments, an estimated delivery cost may include a combined cost of a delivery and transportation of a transport component. In some embodiments, carrier database 112 may include a location of a transport component. Carrier database 112 may include data showing which carrier of plurality of carriers 120 is in possession of a transport component. In some embodiments, computing device 104 may be configured to be communicatively connected to a carrier network. As used herein, "communicatively connected" is a process whereby one device, component, or circuit is able to receive data from and/or transmit data to another device, component, or circuit. A "carrier network" as used in this disclosure is any grouping of two or more carrier devices that share information to one another.

Still referring to FIG. 1, in some embodiments one or more carriers of plurality of carriers 120 may include a central identification unit. A "central identification unit" as used in this disclosure is any physical device that comprises a unified digital tag which remains identical between groups of carriers. In some embodiments, a central identification unit may include a passive identification such as but not limited to a quick response (QR) code. A "QR" code as used in this disclosure is a type of matrix barcode with a machine-readable optical label that contains information about the item to which it is attached. A QR code may include black squares arranged in a square grid on a white background which may be read by an imaging device. A QR code may be configured to be processed using Reed-Solomon error correction. In other embodiments, a central identification unit may include a power source, computing device, and/or transmitting circuitry, and/or receiving circuitry. In some embodiments, a power source may include a battery cell. In some embodiments, a central identification unit may include a radio frequency identification (RFID) tag. An RFID tag may be configured to utilize electromagnetic fields to automatically identify and track objects. In some embodiments, an RFID system may include a radio transponder, radio receiver, and/or radio transmitter. In some embodiments, an RFID system may include a passive system. A passive RFID system may include an RFID tag that may be powered by energy from an RFID readers electromagnetic waves. In other embodiments, an RFID tag may be actively powered by a power source such as a battery. In other embodiments, a central identification unit may include a near field communication (NFC) tag. An NFC tag may include an antenna that may be configured to inductively couple with another antenna. Inductive coupling may include a configuration in which a change in current through one conductor wire induces a voltage across another conductive wire and vice versa. In some embodiments, an NFC system may be configured to communicate data between two electronic components within a distance of 4 cm or less. In some embodiments, an NFC system may be configured to communicate data between two electronic components over a distance of greater than 4 cm. In some embodiments, an NFC system may include a plurality of modes, such as but not limited to, card emulation, reader/write, and/or peer-to peer modes. In other embodiments, a central identification unit may include a unique identification number (UID). A UID may be configured to prevent any duplicate identity records of an entity. In some embodiments, a central identification unit may include a digital object identifier (DOI). A DOI may include a persistent identifier and/or handle used to identify objects uniquely, standardized by the International Organization for Standardization. A central identification unit may include a hash function. In some embodiments, a central identification unit may include a form of security utilizing an immutable sequence listing. An immutable sequence listing may be described in further detail below with respect to FIG. 3.

Still referring to FIG. 1, computing device 104 may include carrier optimization model 116. Carrier optimization model 116 may include an optimization model. An optimization model may include an optimization criterion. An "optimization criterion" as used in this disclosure is a value that is sought to be maximized or minimized in a process. An optimization criterion may include any description of a desired value or range of values for one or more attributes of a carrier selection; desired value or range of values may include a maximal or minimal value, a range between maximal or minimal values, or an instruction to maximize or minimize an attribute. As a non-limiting example, an optimization criterion may specify that a carrier should complete a transport as quickly as possible, for instance by minimizing the transport time; an optimization criterion may limit a transport time, for instance specifying that it must be completed before a certain date or time, or within a certain period of time. An optimization criterion may alternatively request that transport time be greater than a certain value. An optimization criterion may specify one or more tolerances for precision in transport. An optimization criterion may specify one or more desired cost attributes for the transport. In an embodiment, at least an optimization criterion may assign weights to different attributes or values associated with attributes; weights, as used herein, may be multipliers or other scalar numbers reflecting a relative importance of a particular attribute or value. One or more weights may be expressions of value to a supplier of a particular outcome, attribute value, or other facet of a transportation process; value may be expressed, as a non-limiting example, in remunerative form, such as a quantity of a medium of exchange, a monetary unit, or the like. As a non-limiting example, minimization of transport time may be multiplied by a first weight, while tolerance above a certain value may be multiplied by a second weight. Optimization criteria may be combined in weighted or unweighted combinations into a function reflecting an overall outcome desired by a user; function may be a cost function to be minimized and/or maximized. Function may be defined by reference to transport constraints and/or weighted aggregation thereof as provided by a plurality of remote computing devices; for instance, a cost function combining optimization criteria may seek to minimize or maximize a function of transportation constraints. As a non-limiting example, a cost function combining optimization criteria may seek to minimize transport times. As another non-limiting example, a cost function combining optimization criteria may seek to maximize transport recipient preference.

Still referring to FIG. 1, computing device 104 may use carrier optimization model 116 to compare a first carrier selection to a second carrier selection. Generation of carrier optimization model 116 may include generation of a function to score and weight factors to achieve a process score for each feasible pairing. In some embodiments, pairings may be scored in a matrix for optimization, where columns represent transport requests and rows represent carriers potentially paired therewith; each cell of such a matrix may represent a score of a pairing of the corresponding transport request to the corresponding carrier. In some embodiments, assigning a predicted process that optimizes the objective function includes performing a greedy algorithm process. A "greedy algorithm" is defined as an algorithm that selects locally optimal choices, which may or may not generate a globally optimal solution. For instance, carrier optimization model 116 may select pairings so that scores associated therewith are the best score for each transport request and/or for each carrier selection. In such an example, optimization may determine the combination of carriers such that each transport request pairing includes the highest score possible.

Still referring to FIG. 1, carrier optimization model 116 may be formulated as a linear objective function. Carrier optimization model 116 may solve an objective function using a linear program such as without limitation a mixed-integer program. A "linear program," as used in this disclosure, is a program that optimizes a linear objective function, given at least a constraint. For instance, and without limitation, objective function may seek to maximize a total score $\Sigma_{r \in R} \Sigma_{s \in S} c_{rs} x_{rs}$, where R is a set of all transport requests r, S is a set of all carriers s, $c_{rs}$ is a score of a pairing of a given transport request with a given carrier, and $x_{rs}$ is 1 if a transport request r is paired with a carrier s, and 0 otherwise. Continuing the example, constraints may specify that each transport request is assigned to only one carrier, and each carrier is assigned only one transport requests. Transport requests may include transport requests as described above. Sets of transport requests may be optimized for a maximum score combination of all generated carrier selections. In various embodiments, carrier optimization model 116 may determine a combination of transport requests that maximizes a total score subject to a constraint that all transport requests are paired to exactly one carrier selection. Not all carrier selections may receive a transport request pairing since each carrier may only transport one transport component. A mathematical solver may be implemented to solve for the set of feasible pairings that maximizes the sum of scores across all pairings; mathematical solver may be implemented on computing device 104 and/or another device in system 100, and/or may be implemented on third-party solver.

With continued reference to FIG. 1, carrier optimization model 116 may include minimizing a loss function, where a "loss function" is an expression an output of which an optimization model minimizes to generate an optimal result. As a non-limiting example, carrier optimization model 116 may assign variables relating to a set of parameters, which may correspond to score transport requests as described above, calculate an output of mathematical expression using the variables, and select a pairing that produces an output having the lowest size, according to a given definition of "size," of the set of outputs representing each of plurality of candidate ingredient combinations; size may, for instance, included absolute value, numerical size, or the like. Selection of different loss functions may result in identification of different potential pairings as generating minimal outputs. Objectives represented in an objective function and/or loss function may include minimization of transportation times. Objectives may include minimization of costs of transporting a transport component. Objectives may include minimization of carriers and/or resources used. Objectives may include minimization of a difference between a selected transport path and an actual transport path taken. Objectives may include minimization of carrier cost.

Still referring to FIG. 1, computing device 104 may utilize carrier optimization model 116 to generate carrier selection 124. Carrier selection 124 may include a carrier selected from plurality of carriers 120. Carrier selection 124 may be generated by a plurality of factors including, but not limited to, transport type, transport distance, cost, transport component, and the like. In a non-limiting example, carrier selection 124 may include an arrangement of selected carriers where each carrier may be transporting the same transport component of transport request 108. In another non-limiting example, carrier selection 124 may include an arrangement of selected carriers where each carrier may include a least expensive cost. In another non-limiting example, carrier selection 124 may include an arrangement of carriers following similar or the same transport paths. In some embodiments, carrier selection 124 may include a second best selection of a carrier. Computing device 124 may be configured to display carrier selection 124 through a graphical user interface (GUI) or other display. Computing device 104 may be configured to receive a user input. A user may reject carrier selection 124. Computing device 104 may generate a new carrier selection 124 as a function of a received user input. Computing device 104 may repeat a selection process iteratively until a user accepts carrier selection 124. Computing device 104 may utilize a machine learning model to identify and predict carrier selections based on transport routes, transport costs, transport times, alternative transport routes, carrier types, transport component types, carrier types, and the like of a transport request. In some embodiments, computing device 104 may utilize a machine learning process to rank a selection of carriers of a carrier group. Carrier optimization model 116 may be configured to receive training data. Training data may correlate a plurality of transport data to a carrier ranking. Carrier optimization model 116 may be configured to train a machine learning model as a function of training data. Carrier optimization model 116 may be configured to rank a group of carriers. Ranking a group of carriers may include ranking each carrier of a group of carriers as a function of a machine learning model. A machine learning model may be configured to input a plurality of transport data and output a carrier ranking of each carrier of a group of carriers. In some embodiments, carrier optimization model 116 may be configured to update carrier selection 124 as a function of a second optimization criteria. A second optimization criteria may include one or more transport parameters. In some embodiments, a second optimization criteria may include, but is not limited to, cost, transport time, transport priority, and the like. In some embodiments, carrier optimization model 116 may utilize a machine-learning model to determine one or more transport parameters. A machine learning model may be configured to input a plurality of transport data and output one or more transport parameters. As a non-limiting example, a machine-learning model may input transport data and output time limits, cost boundaries, transport routes, and the like. In some embodiments, a machine learning model may be configured to identify and/or set transport constraints. As a non-limiting example, a machine-learning model may input a plurality of transport data and output a cost constraint, time constraint, resource constraint, distance constraint, and the like. A machine-learning model may be as described with reference to FIG. 4.

Figure 2:
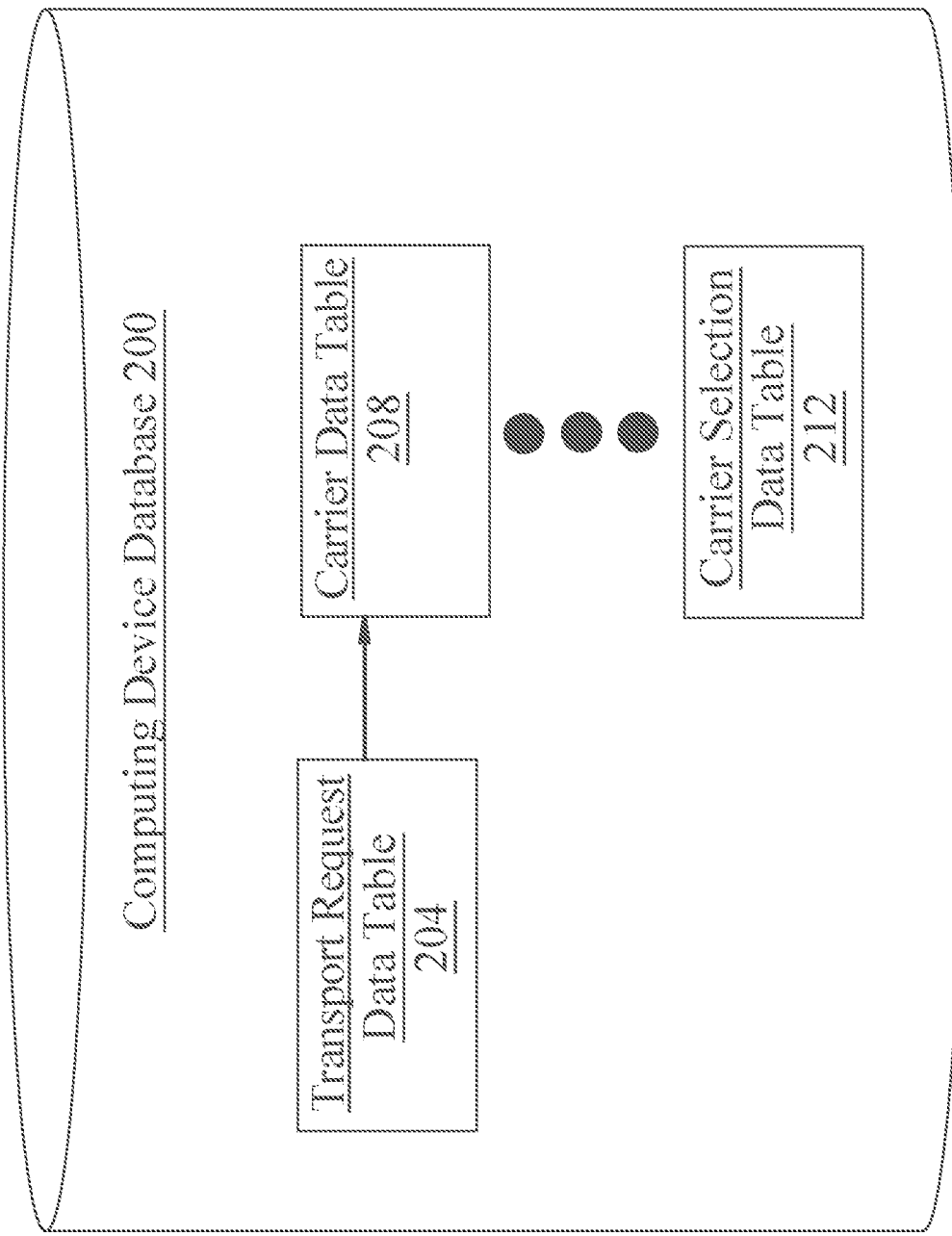
FIG. 2 is a block diagram of an exemplary embodiment of a computing device database.

Now referring to FIG. 2, an exemplary embodiment of a computing device database 200 is shown. Computing device database 200 may include a plurality of carrier data. In some embodiments, computing device database 200 may include carrier database 112. Determinations by a machine-learning process, machine-learning model, ranking function, and/or classifier, may also be stored and/or retrieved from computing device database 200. As a non-limiting example, computing device database 200 may organize data according to one or more instruction tables. One or more tables may be linked to one another by, for instance in a non-limiting example, common column values. For instance, a common column between two tables may include an identifier of a submission, such as a form entry, textual submission, accessory device tokens, local access addresses, metrics, and the like, for instance as defined herein; as a result, a search by a computing device may be able to retrieve all rows from any table pertaining to a given submission or set thereof. Other columns may include any other category usable for organization or subdivision of data, including types of data, names and/or identifiers of individuals submitting the data, times of submission, and the like; persons skilled in the art, upon reviewing the entirety of this disclosure, will be aware of various ways in which data from one or more tables may be linked and/or related to data in one or more other tables. One or more tables may include, without limitation, a heuristic table, which may organize rankings, scores, models, outcomes, functions, numerical values, scales, arrays, matrices, and the like, that represent determinations, probabilities, metrics, parameters, values, standards, indexes, and the like, include one or more inputs describing potential mathematical relationships, as described herein.

Still referring to FIG. 2, computing device database 200 may include one or more transport request data tables 204. Transport request data table 204 may include data of a transport request. Data of a transport request may include transport component data. Transport component data may include, but is not limited to, transport component type, transport component height, transport component length, transport component width, transport component value, transport component weight, transport component location, transport type, dates, time, locations, destinations, and the like. In some embodiments, transport request data table 204 may include data of transport parameters, such as, but not limited to, dates, times, locations, costs, transport type, carrier type, and the like. In some embodiments, transport request data table 204 may include a history of transport requests. Computing device database 200 may include one or more carrier data tables 208. Carrier data table 208 may include data of a carrier including, but not limited to, carrier type, carrier location, carrier remittance, carrier transport path, carrier transport unit type, estimated transport times, and the like. In some embodiments, carrier data table 208 may be updated with data from transport request data table 204. Transport request data table 204 may communicate transport parameters to carrier data table 208. Carrier data table 208 may update carrier data as a function of transport parameters such as, but not limited to, transport type, transport component type, dates, locations, times, costs, and the like. Carrier data table 208 may update an availability of a carrier as a function of a transport request and/or transport parameters. In some embodiments, carrier data table 208 may be in communication with carrier selection data table 212.

Still referring to FIG. 2, computing device database 200 may include one or more carrier selection data tables 212. Carrier selection data table 212 may include data such as, but not limited to, selected carrier, historically selected carriers based on parameters of transport requests, user rejections of carrier selections, user acceptance of carrier selections, and the like. In some embodiments, carrier data table 208 may be updated as a function of carrier selection data table 212. In other embodiments, carrier selection data table 212 may be updated as a function of carrier data table 208. In some embodiments, carrier data table 208 may be updated by two or more other carrier datum. In some embodiments, carrier selection data table 212 may include data of a selected carrier including, but not limited to, carrier type, carrier location, carrier remittance, carrier transport path, carrier transport unit type, estimated carrier transport times, and the like. Computing device database 200 may include an encryption process to protect data stored in computing device database 200. An encryption process may translate data into another form such that only entities with access to a secure key may access the data. In some embodiments, an encryption process may utilize an immutable sequence listing.

Figure 3:
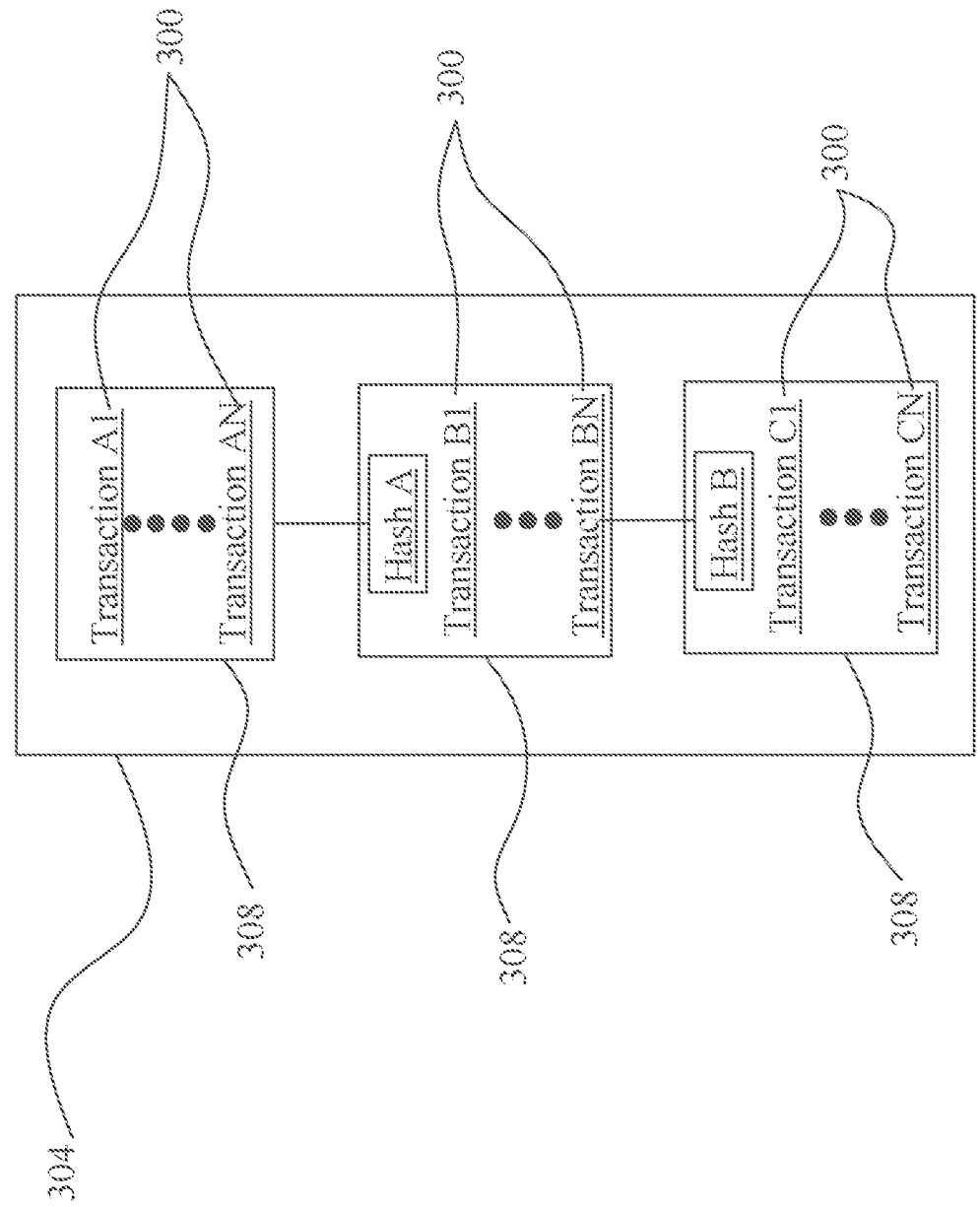
FIG. 3 is a block diagram exemplary embodiment of an immutable sequence listing.

Referring now to FIG. 3, an exemplary embodiment of an immutable sequential listing is shown. An "immutable sequential listing," as used in this disclosure, is a data structure that places data entries in a fixed sequential arrangement, such as a temporal sequence of entries and/or blocks thereof, where the sequential arrangement, once established, cannot be altered or reordered. An immutable sequential listing may be, include and/or implement an immutable ledger, where data entries that have been posted to the immutable sequential listing cannot be altered. In some embodiments, an immutable sequential listing may be utilized by a computing device to establish a secure connection between two or more carriers. In some embodiments, an immutable sequential listing may be used by a computing device to secure transport data, carrier data, and/or transport component data. An immutable sequential listing may be used by a computing device to establish a secure link between a central identification unit and the computing device. In some embodiments, a computing device may utilize an immutable sequential listing to generate a plurality of smart contracts. A "smart contract" as used in this disclosure is a self-executing contract with the terms of agreement between a buyer and a seller being directly written into lines of code. A computing device may use smart contracts between a supplier and one or more carriers. A smart contract may be used by a computing device to manage remittance of one or more carriers.

Referring still to FIG. 3, an exemplary embodiment of an immutable sequential listing 300 is illustrated. Data elements are listing in immutable sequential listing 300; data elements may include any form of data, including textual data, image data, encrypted data, cryptographically hashed data, and the like. Data elements may include, without limitation, one or more at least a digitally signed assertions. In one embodiment, a digitally signed assertion 304 is a collection of textual data signed using a secure proof as described in further detail below; secure proof may include, without limitation, a digital signature as described above. Collection of textual data may contain any textual data, including without limitation American Standard Code for Information Interchange (ASCII), Unicode, or similar computer-encoded textual data, any alphanumeric data, punctuation, diacritical mark, or any character or other marking used in any writing system to convey information, in any form, including any plaintext or cyphertext data; in an embodiment, collection of textual data may be encrypted, or may be a hash of other data, such as a root or node of a Merkle tree or hash tree, or a hash of any other information desired to be recorded in some fashion using a digitally signed assertion 304. In an embodiment, collection of textual data states that the owner of a certain transferable item represented in a digitally signed assertion 304 register is transferring that item to the owner of an address. A digitally signed assertion 304 may be signed by a digital signature created using the private key associated with the owner's public key, as described above.

Still referring to FIG. 3, a digitally signed assertion 304 may describe a transfer of virtual currency, such as cryptocurrency as described below. The virtual currency may be a digital currency. Item of value may be a transfer of trust, for instance represented by a statement vouching for the identity or trustworthiness of the first entity. Item of value may be an interest in a fungible negotiable financial instrument representing ownership in a public or private corporation, a creditor relationship with a governmental body or a corporation, rights to ownership represented by an option, derivative financial instrument, commodity, debt-backed security such as a bond or debenture or other security as described in further detail below. A resource may be a physical machine e.g. a ride share vehicle or any other asset. A digitally signed assertion 304 may describe the transfer of a physical good; for instance, a digitally signed assertion 304 may describe the sale of a product. In some embodiments, a transfer nominally of one item may be used to represent a transfer of another item; for instance, a transfer of virtual currency may be interpreted as representing a transfer of an access right; conversely, where the item nominally transferred is something other than virtual currency, the transfer itself may still be treated as a transfer of virtual currency, having value that depends on many potential factors including the value of the item nominally transferred and the monetary value attendant to having the output of the transfer moved into a particular user's control. The item of value may be associated with a digitally signed assertion 304 by means of an exterior protocol, such as the COLORED COINS created according to protocols developed by The Colored Coins Foundation, the MASTERCOIN protocol developed by the Mastercoin Foundation, or the ETHEREUM platform offered by the Stiftung Ethereum Foundation of Baar, Switzerland, the Thunder protocol developed by Thunder Consensus, or any other protocol.

Still referring to FIG. 3, in one embodiment, an address is a textual datum identifying the recipient of virtual currency or another item of value in a digitally signed assertion 304. In some embodiments, address is linked to a public key, the corresponding private key of which is owned by the recipient of a digitally signed assertion 304. For instance, address may be the public key. Address may be a representation, such as a hash, of the public key. Address may be linked to the public key in memory of a computing device, for instance via a "wallet shortener" protocol. Where address is linked to a public key, a transferee in a digitally signed assertion 304 may record a subsequent a digitally signed assertion 304 transferring some or all of the value transferred in the first a digitally signed assertion 304 to a new address in the same manner. A digitally signed assertion 304 may contain textual information that is not a transfer of some item of value in addition to, or as an alternative to, such a transfer. For instance, as described in further detail below, a digitally signed assertion 304 may indicate a confidence level associated with a distributed storage node as described in further detail below.

In an embodiment, and still referring to FIG. 3 immutable sequential listing 300 records a series of at least a posted content in a way that preserves the order in which the at least a posted content took place. Temporally sequential listing may be accessible at any of various security settings; for instance, and without limitation, temporally sequential listing may be readable and modifiable publicly, may be publicly readable but writable only by entities and/or devices having access privileges established by password protection, confidence level, or any device authentication procedure or facilities described herein, or may be readable and/or writable only by entities and/or devices having such access privileges. Access privileges may exist in more than one level, including, without limitation, a first access level or community of permitted entities and/or devices having ability to read, and a second access level or community of permitted entities and/or devices having ability to write; first and second community may be overlapping or non-overlapping. In an embodiment, posted content and/or immutable sequential listing 300 may be stored as one or more zero knowledge sets (ZKS), Private Information Retrieval (PIR) structure, or any other structure that allows checking of membership in a set by querying with specific properties. Such database may incorporate protective measures to ensure that malicious actors may not query the database repeatedly in an effort to narrow the members of a set to reveal uniquely identifying information of a given posted content.

Still referring to FIG. 3, immutable sequential listing 300 may preserve the order in which the at least a posted content took place by listing them in chronological order; alternatively or additionally, immutable sequential listing 300 may organize digitally signed assertions 304 into sub-listings 308 such as "blocks" in a blockchain, which may be themselves collected in a temporally sequential order; digitally signed assertions 304 within a sub-listing 308 may or may not be temporally sequential. The ledger may preserve the order in which at least a posted content took place by listing them in sub-listings 308 and placing the sub-listings 308 in chronological order. The immutable sequential listing 300 may be a distributed, consensus-based ledger, such as those operated according to the protocols promulgated by Ripple Labs, Inc., of San Francisco, Calif., or the Stellar Development Foundation, of San Francisco, Calif., or of Thunder Consensus. In some embodiments, the ledger is a secured ledger; in one embodiment, a secured ledger is a ledger having safeguards against alteration by unauthorized parties. The ledger may be maintained by a proprietor, such as a system administrator on a server, that controls access to the ledger; for instance, the user account controls may allow contributors to the ledger to add at least a posted content to the ledger, but may not allow any users to alter at least a posted content that have been added to the ledger. In some embodiments, ledger is cryptographically secured; in one embodiment, a ledger is cryptographically secured where each link in the chain contains encrypted or hashed information that makes it practically infeasible to alter the ledger without betraying that alteration has taken place, for instance by requiring that an administrator or other party sign new additions to the chain with a digital signature. Immutable sequential listing 300 may be incorporated in, stored in, or incorporate, any suitable data structure, including without limitation any database, datastore, file structure, distributed hash table, directed acyclic graph or the like. In some embodiments, the timestamp of an entry is cryptographically secured and validated via trusted time, either directly on the chain or indirectly by utilizing a separate chain. In one embodiment the validity of timestamp is provided using a time stamping authority as described in the RFC 3161 standard for trusted timestamps, or in the ANSI ASC x9.95 standard. In another embodiment, the trusted time ordering is provided by a group of entities collectively acting as the time stamping authority with a requirement that a threshold number of the group of authorities sign the timestamp.

In some embodiments, and with continued reference to FIG. 3, immutable sequential listing 300, once formed, may be inalterable by any party, no matter what access rights that party possesses. For instance, immutable sequential listing 300 may include a hash chain, in which data is added during a successive hashing process to ensure non-repudiation. Immutable sequential listing 300 may include a block chain. In one embodiment, a block chain is immutable sequential listing 300 that records one or more new at least a posted content in a data item known as a sub-listing 308 or "block." An example of a block chain is the BITCOIN block chain used to record BITCOIN transactions and values. Sub-listings 308 may be created in a way that places the sub-listings 308 in chronological order and link each sub-listing 308 to a previous sub-listing 308 in the chronological order so that any computing device may traverse the sub-listings 308 in reverse chronological order to verify any at least a posted content listed in the block chain. Each new sub-listing 308 may be required to contain a cryptographic hash describing the previous sub-listing 308. In some embodiments, the block chain contains a single first sub-listing 308 sometimes known as a "genesis block."

Still referring to FIG. 3, the creation of a new sub-listing 308 may be computationally expensive; for instance, the creation of a new sub-listing 308 may be designed by a "proof of work" protocol accepted by all participants in forming the immutable sequential listing 300 to take a powerful set of computing devices a certain period of time to produce. Where one sub-listing 308 takes less time for a given set of computing devices to produce the sub-listing 308 protocol may adjust the algorithm to produce the next sub-listing 308 so that it will require more steps; where one sub-listing 308 takes more time for a given set of computing devices to produce the sub-listing 308 protocol may adjust the algorithm to produce the next sub-listing 308 so that it will require fewer steps. As an example, protocol may require a new sub-listing 308 to contain a cryptographic hash describing its contents; the cryptographic hash may be required to satisfy a mathematical condition, achieved by having the sub-listing 308 contain a number, called a nonce, whose value is determined after the fact by the discovery of the hash that satisfies the mathematical condition. Continuing the example, the protocol may be able to adjust the mathematical condition so that the discovery of the hash describing a sub-listing 308 and satisfying the mathematical condition requires more or less steps, depending on the outcome of the previous hashing attempt. Mathematical condition, as an example, might be that the hash contains a certain number of leading zeros and a hashing algorithm that requires more steps to find a hash containing a greater number of leading zeros, and fewer steps to find a hash containing a lesser number of leading zeros. In some embodiments, production of a new sub-listing 308 according to the protocol is known as "mining." The creation of a new sub-listing 308 may be designed by a "proof of stake" protocol as will be apparent to those skilled in the art upon reviewing the entirety of this disclosure.

Continuing to refer to FIG. 3, in some embodiments, protocol also creates an incentive to mine new sub-listings 308. The incentive may be financial; for instance, successfully mining a new sub-listing 308 may result in the person or entity that mines the sub-listing 308 receiving a predetermined amount of currency. The currency may be fiat currency. Currency may be cryptocurrency as defined below. In other embodiments, incentive may be redeemed for particular products or services; the incentive may be a gift certificate with a particular business, for instance. In some embodiments, incentive is sufficiently attractive to cause participants to compete for the incentive by trying to race each other to the creation of sub-listings 308 Each sub-listing 308 created in immutable sequential listing 300 may contain a record or at least a posted content describing one or more addresses that receive an incentive, such as virtual currency, as the result of successfully mining the sub-listing 308.

With continued reference to FIG. 3, where two entities simultaneously create new sub-listings 308, immutable sequential listing 300 may develop a fork; protocol may determine which of the two alternate branches in the fork is the valid new portion of the immutable sequential listing 300 by evaluating, after a certain amount of time has passed, which branch is longer. "Length" may be measured according to the number of sub-listings 308 in the branch. Length may be measured according to the total computational cost of producing the branch. Protocol may treat only at least a posted content contained the valid branch as valid at least a posted content. When a branch is found invalid according to this protocol, at least a posted content registered in that branch may be recreated in a new sub-listing 308 in the valid branch; the protocol may reject "double spending" at least a posted content that transfer the same virtual currency that another at least a posted content in the valid branch has already transferred. As a result, in some embodiments the creation of fraudulent at least a posted content requires the creation of a longer immutable sequential listing 300 branch by the entity attempting the fraudulent at least a posted content than the branch being produced by the rest of the participants; as long as the entity creating the fraudulent at least a posted content is likely the only one with the incentive to create the branch containing the fraudulent at least a posted content, the computational cost of the creation of that branch may be practically infeasible, guaranteeing the validity of all at least a posted content in the immutable sequential listing 300.

Still referring to FIG. 3, additional data linked to at least a posted content may be incorporated in sub-listings 308 in the immutable sequential listing 300; for instance, data may be incorporated in one or more fields recognized by block chain protocols that permit a person or computer forming a at least a posted content to insert additional data in the immutable sequential listing 300. In some embodiments, additional data is incorporated in an unspendable at least a posted content field. For instance, the data may be incorporated in an OP_RETURN within the BITCOIN block chain. In other embodiments, additional data is incorporated in one signature of a multi-signature at least a posted content. In an embodiment, a multi-signature at least a posted content is at least a posted content to two or more addresses. In some embodiments, the two or more addresses are hashed together to form a single address, which is signed in the digital signature of the at least a posted content. In other embodiments, the two or more addresses are concatenated. In some embodiments, two or more addresses may be combined by a more complicated process, such as the creation of a Merkle tree or the like. In some embodiments, one or more addresses incorporated in the multi-signature at least a posted content are typical crypto-currency addresses, such as addresses linked to public keys as described above, while one or more additional addresses in the multi-signature at least a posted content contain additional data related to the at least a posted content; for instance, the additional data may indicate the purpose of the at least a posted content, aside from an exchange of virtual currency, such as the item for which the virtual currency was exchanged. In some embodiments, additional information may include network statistics for a given node of network, such as a distributed storage node, e.g. the latencies to nearest neighbors in a network graph, the identities or identifying information of neighboring nodes in the network graph, the trust level and/or mechanisms of trust (e.g. certificates of physical encryption keys, certificates of software encryption keys, (in non-limiting example certificates of software encryption may indicate the firmware version, manufacturer, hardware version and the like), certificates from a trusted third party, certificates from a decentralized anonymous authentication procedure, and other information quantifying the trusted status of the distributed storage node) of neighboring nodes in the network graph, IP addresses, GPS coordinates, and other information informing location of the node and/or neighboring nodes, geographically and/or within the network graph. In some embodiments, additional information may include history and/or statistics of neighboring nodes with which the node has interacted. In some embodiments, this additional information may be encoded directly, via a hash, hash tree or other encoding.

With continued reference to FIG. 3, in some embodiments, virtual currency is traded as a crypto-currency. In one embodiment, a crypto-currency is a digital, currency such as Bitcoins, Peercoins, Namecoins, and Litecoins. Crypto-currency may be a clone of another crypto-currency. The crypto-currency may be an "alt-coin." Crypto-currency may be decentralized, with no particular entity controlling it; the integrity of the crypto-currency may be maintained by adherence by its participants to established protocols for exchange and for production of new currency, which may be enforced by software implementing the crypto-currency. Crypto-currency may be centralized, with its protocols enforced or hosted by a particular entity. For instance, crypto-currency may be maintained in a centralized ledger, as in the case of the XRP currency of Ripple Labs, Inc., of San Francisco, Calif. In lieu of a centrally controlling authority, such as a national bank, to manage currency values, the number of units of a particular crypto-currency may be limited; the rate at which units of crypto-currency enter the market may be managed by a mutually agreed-upon process, such as creating new units of currency when mathematical puzzles are solved, the degree of difficulty of the puzzles being adjustable to control the rate at which new units enter the market. Mathematical puzzles may be the same as the algorithms used to make productions of sub-listings 308 in a block chain computationally challenging; the incentive for producing sub-listings 308 may include the grant of new crypto-currency to the miners. Quantities of crypto-currency may be exchanged using at least a posted content as described above.

Figure 4:
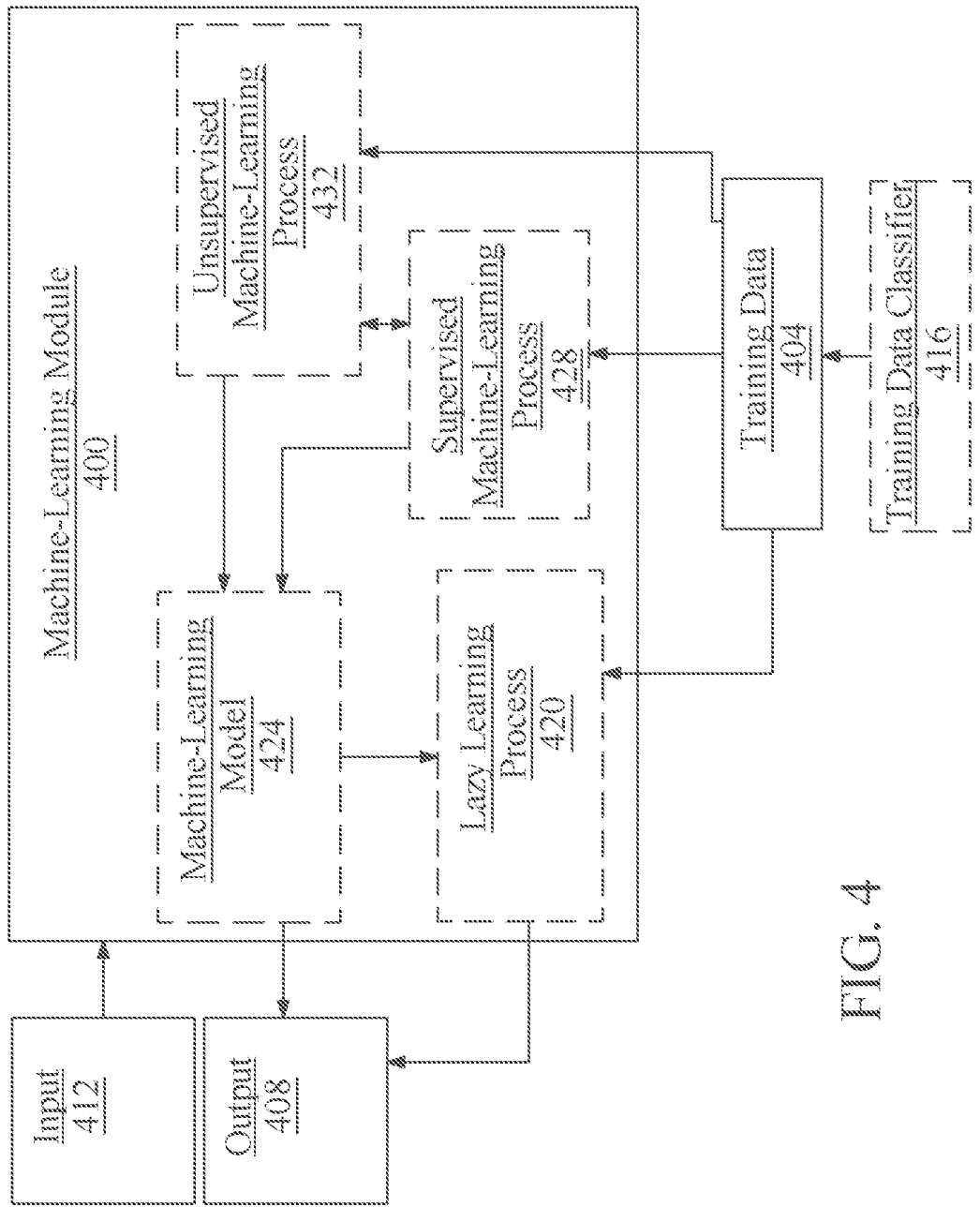
FIG. 4 is a block diagram of a machine learning system.

Referring now to FIG. 4, an exemplary embodiment of a machine-learning module 400 that may perform one or more machine-learning processes as described in this disclosure is illustrated. A computing device may utilize machine-learning module 400 to predict a transport path of a carrier group, carrier group performance, carrier group remittance, and type of carrier based on a transport component category. In some embodiments, a computing device may utilize machine-learning module 400 that may be trained with data from computing device database 400. Machine-learning module 400 may perform determinations, classification, and/or analysis steps, methods, processes, or the like as described in this disclosure using machine learning processes. A "machine learning process," as used in this disclosure, is a process that automatically uses training data 404 to generate an algorithm that will be performed by a computing device/module to produce outputs 408 given data provided as inputs 412; this is in contrast to a non-machine learning software program where the commands to be executed are determined in advance by a user and written in a programming language.

Still referring to FIG. 4, "training data," as used herein, is data containing correlations that a machine-learning process may use to model relationships between two or more categories of data elements. For instance, and without limitation, training data 404 may include a plurality of data entries, each entry representing a set of data elements that were recorded, received, and/or generated together; data elements may be correlated by shared existence in a given data entry, by proximity in a given data entry, or the like. Training data 404 may be received and/or collected from a computing device database. In other embodiments, training data 404 may be received from a user input. Training data 404 may be received from previous iterations of training data vectors. In some embodiments, training data 404 may be received by one or more remote devices that at least correlate carrier data and transport data. In some embodiments, training data 404 may correlate transport request data to selected carrier data. Multiple data entries in training data 404 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 404 according to various correlations; correlations may indicate causative and/or predictive links between categories of data elements, which may be modeled as relationships such as mathematical relationships by machine-learning processes as described in further detail below. Training data 404 may be formatted and/or organized by categories of data elements, for instance by associating data elements with one or more descriptors corresponding to categories of data elements. As a non-limiting example, training data 404 may include data entered in standardized forms by persons or processes, such that entry of a given data element in a given field in a form may be mapped to one or more descriptors of categories. Elements in training data 404 may be linked to descriptors of categories by tags, tokens, or other data elements; for instance, and without limitation, training data 404 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 4, training data 404 may include one or more elements that are not categorized; that is, training data 404 may not be formatted or contain descriptors for some elements of data. Machine-learning algorithms and/or other processes may sort training data 404 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 404 to be made applicable for two or more distinct machine-learning algorithms as described in further detail below. Training data 404 used by machine-learning module 400 may correlate any input data as described in this disclosure to any output data as described in this disclosure. As a non-limiting illustrative example carrier data and/or transport request data may be inputs, wherein an output may be a carrier selection.

Further referring to FIG. 4, training data may be filtered, sorted, and/or selected using one or more supervised and/or unsupervised machine-learning processes and/or models as described in further detail below; such models may include without limitation a training data classifier 416. Training data classifier 416 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 400 may generate a classifier using a classification algorithm, defined as a processes whereby a computing device and/or any module and/or transport component operating thereon derives a classifier from training data 404. Classification may be performed using, without limitation, linear classifiers such as without limitation logistic regression and/or naïve Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to sub-categories of transport request data such as location, direction, transport type, transport times, and the like thereof.

Still referring to FIG. 4, machine-learning module 400 may be configured to perform a lazy-learning process 420 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 404. Heuristic may include selecting some number of highest-ranking associations and/or training data 404 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 4, machine-learning processes as described in this disclosure may be used to generate machine-learning models 424. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 424 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 424 may be generated by creating an artificial neural network, such as a convolutional neural network comprising an input layer of nodes, one or more intermediate layers, and an output layer of nodes. Connections between nodes may be created via the process of "training" the network, in which elements from a training data 404 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, machine-learning algorithms may include at least a supervised machine-learning process 428. At least a supervised machine-learning process 428, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include carrier data and/or transport request data as described above as inputs, carrier selections as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 404. Persons skilled in the art, upon reviewing the entirety of this disclosure, will be aware of various possible variations of at least a supervised machine-learning process 428 that may be used to determine relation between inputs and outputs. Supervised machine-learning processes may include classification algorithms as defined above.

Further referring to FIG. 4, machine learning processes may include at least an unsupervised machine-learning processes 432. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 4, machine-learning module 400 may be designed and configured to create a machine-learning model 424 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 4, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 5:
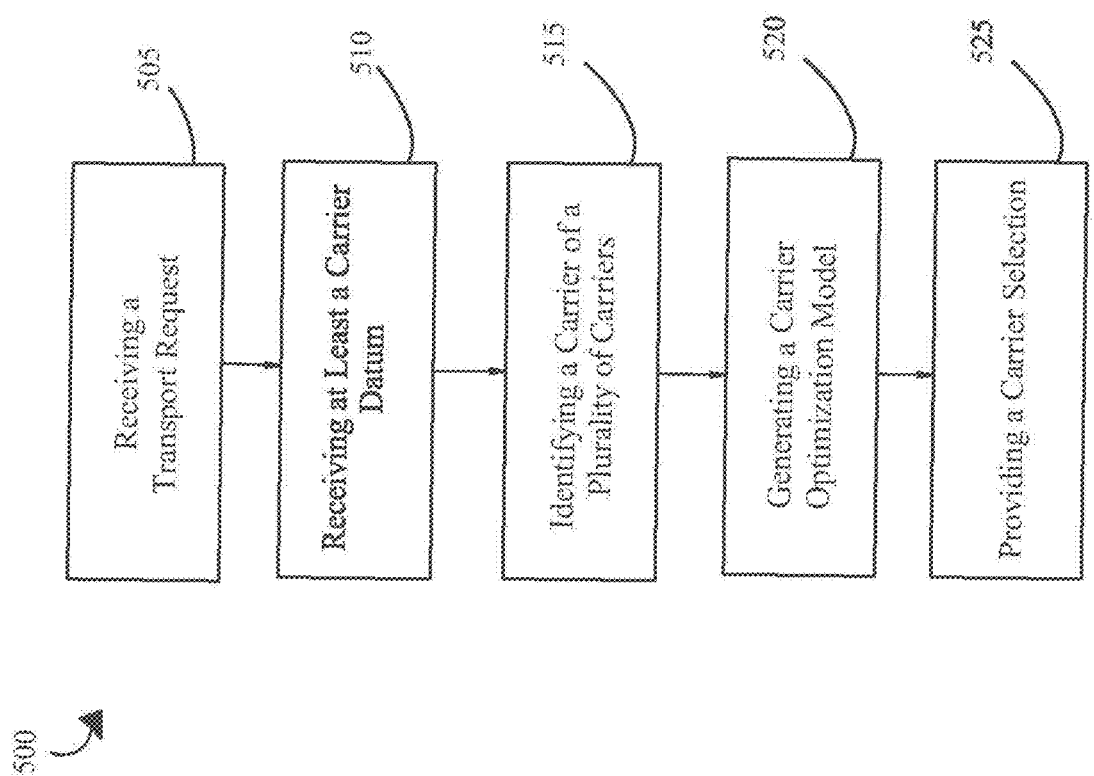
FIG. 5 is a block diagram illustrating an exemplary embodiment of a method of selecting a carrier.

Now referring to FIG. 5, method 500 for carrier selection is presented. At step 505, method 500 includes receiving a transport request. A transport request may be received at a computing device. In some embodiments, a transport request may include a set of transport parameters. Transport parameters may include, but are not limited to, user preference, transport type, transport times, transport component type, dates, times, locations, costs, and the like This step may be implemented, without limitation, as described in FIGS. 1-4.

Still referring to FIG. 5, at step 510, method 500 includes receiving at least a carrier datum. At least a carrier datum may be received from a carrier database. In some embodiments, at least a carrier datum may correspond to a carrier of a plurality of carriers. Carrier datum may include, but is not limited to, carrier type, carrier costs, carrier availability, carrier transport times, and the like. Carrier data of a plurality of carriers may be communicated to a carrier database of a computing device. This step may be implemented, without limitation, as described in FIGS. 1-4.

Still referring to FIG. 5, at step 515, method 500 includes identifying a carrier of a plurality of carriers. Identifying a carrier may include identifying an available carrier. In some embodiments, a carrier may be identified by a digital signal, such as, but not limited to, an RFID, NFC, or other signal. In some embodiments, a carrier is identified within a carrier database. Identifying a carrier may include selecting an initial carrier to complete a transport request. This step may be implemented, without limitation, as described in FIGS. 1-4.

Still referring to FIG. 5, at step 520, method 500 includes generating a carrier optimization model. An optimization model may include an objective function. A carrier optimization model may be generated as a function of a transport request. In some embodiments, a carrier optimization model may be configured to optimize a parameter such as, but not limited to, cost, transport time, transport component, destination, and the like. In some embodiments, a carrier selection may be updated as a function of at least a second optimization criteria. In some embodiments, a carrier optimization model may be configured to receive training data. Training data may include a plurality of transport data correlated to a carrier ranking. A carrier optimization model may train a machine learning model with training data. A carrier optimization model may rank, as a function of a machine learning model, a group of carriers. A machine learning model may be configured to input a plurality of transport data and output, as a function of the plurality of transport data, a carrier ranking of each carrier of a group of carriers. This step may be implemented, without limitation, as described in FIGS. 1-4.

Still referring to FIG. 5, at step 525, method 500 includes providing a carrier selection. Providing a carrier selection may include selecting a carrier as a function of a carrier optimization model, a transport request, and an identified carrier. In some embodiments, a carrier selection may be displayed on a graphical user interface. In other embodiments, a carrier selection may be displayed on a smartphone, laptop, desktop, tablet, and/or other display. In some embodiments, a second best carrier selection may be presented along with a carrier selection. In some embodiments, providing a carrier selection may include receiving a user input. A user input may include an acceptance or rejection of a carrier selection. A carrier optimization model may generate a second carrier selection as a function of a transport request and a user input. This step may be implemented, without limitation, as described in FIGS. 1-4.

Figure 6:
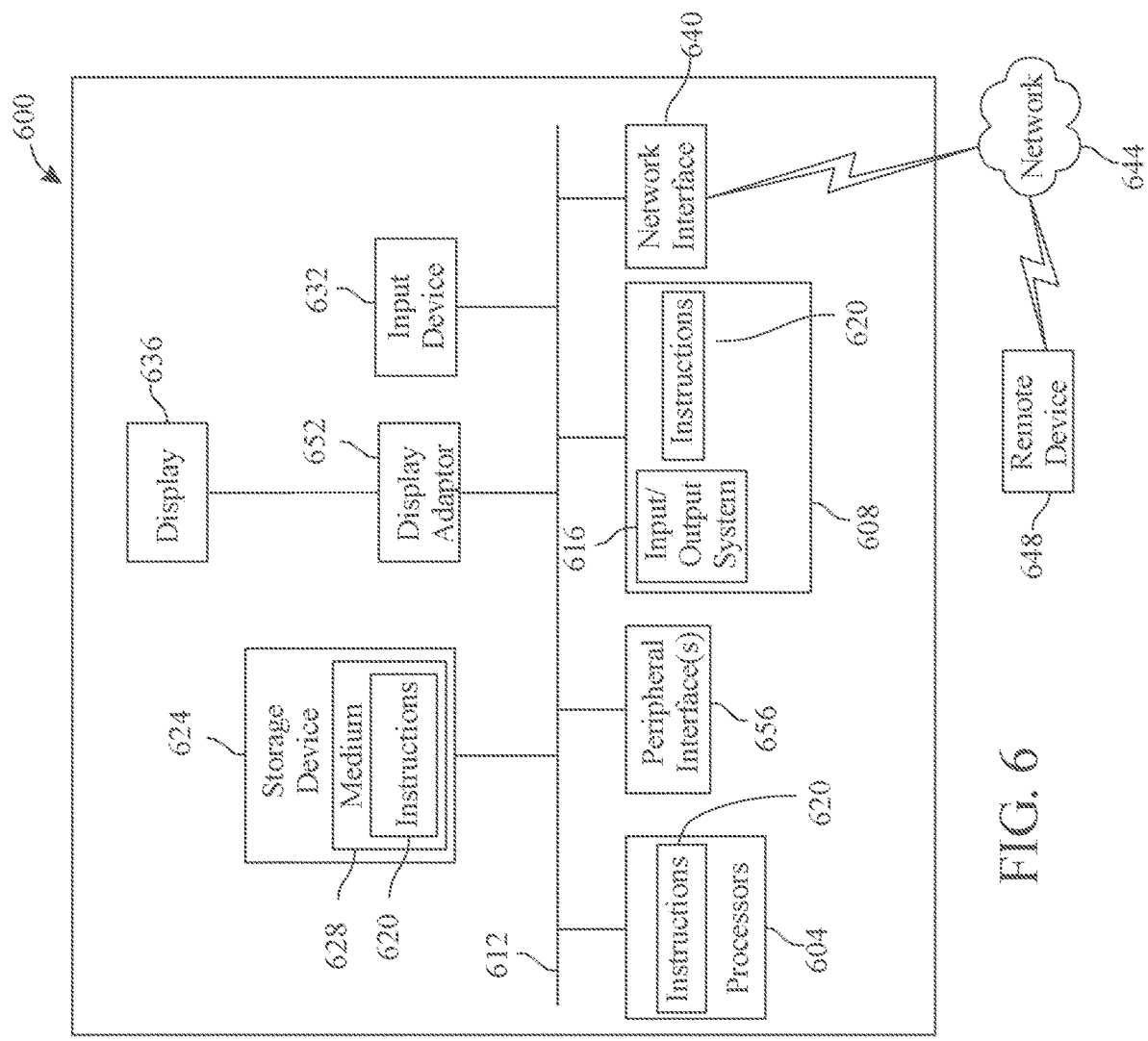
FIG. 6 is a block diagram of a computing system that can be used to implement any one or more of the methodologies disclosed herein and any one or more portions thereof.

FIG. 6 shows a diagrammatic representation of one embodiment of a computing device in the exemplary form of a computer system 600 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 600 includes a processor 604 and a memory 608 that communicate with each other, and with other components, via a bus 612. Bus 612 may include any of several types of bus structures including, but not limited to, a memory bus, a memory controller, a peripheral bus, a local bus, and any combinations thereof, using any of a variety of bus architectures.

Processor 604 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 604 may be organized according to Von Neumann and/or Harvard architecture as a non-limiting example. Processor 604 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Still referring to FIG. 6, memory 608 may include various components (e.g., machine-readable media) including, but not limited to, a random-access memory component, a read only component, and any combinations thereof. In one example, a basic input/output system 616 (BIOS), including basic routines that help to transfer information between elements within computer system 600, such as during start-up, may be stored in memory 608. Memory 608 may also include (e.g., stored on one or more machine-readable media) instructions (e.g., software) 620 embodying any one or more of the aspects and/or methodologies of the present disclosure. In another example, memory 608 may further include any number of program modules including, but not limited to, an operating system, one or more application programs, other program modules, program data, and any combinations thereof.

Still referring to FIG. 6, computer system 600 may also include a storage device 624. Examples of a storage device (e.g., storage device 624) include, but are not limited to, a hard disk drive, a magnetic disk drive, an optical disc drive in combination with an optical medium, a solid-state memory device, and any combinations thereof. Storage device 624 may be connected to bus 612 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 624 (or one or more components thereof) may be removably interfaced with computer system 600 (e.g., via an external port connector (not shown)). Particularly, storage device 624 and an associated machine-readable medium 628 may provide nonvolatile and/or volatile storage of machine-readable instructions, data structures, program modules, and/or other data for computer system 600. In one example, software 620 may reside, completely or partially, within machine-readable medium 628. In another example, software 620 may reside, completely or partially, within processor 604.

Still referring to FIG. 6, computer system 600 may also include an input device 632. In one example, a user of computer system 600 may enter commands and/or other information into computer system 600 via input device 632. Examples of an input device 632 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 632 may be interfaced to bus 612 via any of a variety of interfaces (not shown) including, but not limited to, a serial interface, a parallel interface, a game port, a USB interface, a FIREWIRE interface, a direct interface to bus 612, and any combinations thereof. Input device 632 may include a touch screen interface that may be a part of or separate from display device 636, discussed further below. Input device 632 may be utilized as a user selection device for selecting one or more graphical representations in a graphical interface as described above.

Still referring to FIG. 6, a user may also input commands and/or other information to computer system 600 via storage device 624 (e.g., a removable disk drive, a flash drive, etc.) and/or network interface device 640. A network interface device, such as network interface device 640, may be utilized for connecting computer system 600 to one or more of a variety of networks, such as network 644, and one or more remote devices 648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 644, may employ a wired and/or a wireless mode of communication. In general, any network topology may be used. Information (e.g., data, software 620, etc.) may be communicated to and/or from computer system 600 via network interface device 640.

Still referring to FIG. 6, computer system 600 may further include a video display adapter 652 for communicating a displayable image to a display device, such as display device 636. Examples of a display device include, but are not limited to, a liquid crystal display (LCD), a cathode ray tube (CRT), a plasma display, a light emitting diode (LED) display, and any combinations thereof. Display adapter 652 and display device 636 may be utilized in combination with processor 604 to provide graphical representations of aspects of the present disclosure. In addition to a display device, computer system 600 may include one or more other peripheral output devices including, but not limited to, an audio speaker, a printer, and any combinations thereof. Such peripheral output devices may be connected to bus 612 via a peripheral interface 656. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for carrier selection, comprising:
   a computing device configured to:
   receive a transport request from an external computing device, wherein the transport request comprises transport request data conveyed to the computing device;
   secure the transport request data by an immutable sequential listing;
   receive, from a carrier database, at least a carrier datum corresponding to at least a carrier of a plurality of carriers, wherein the at least a carrier datum comprises at least a transport path for the at least a carrier of the plurality of carriers comprising directions between a departure point and an arrival point;
   generate a carrier optimization model as a function of the transport request, wherein the carrier optimization model minimizes a loss function and is configured to:
   receive training data, wherein the training data correlates a plurality of transport data to a carrier ranking;

train a first machine learning model as a function of the training data;

determine at least one transport parameter as a function of a first machine learning model, the first machine learning model configured to receive the transport request data as an input and output the at least one transport parameter; and rank, as a function of a second machine learning model, a group of carriers, wherein the first machine learning model receives the transport request data and the at least one transport parameter determined as a function of the first machine learning model as an input and outputs a carrier ranking of each carrier of the group of carriers;

identify a carrier of the plurality of carriers to complete the transport request as a function of the transport request, the determined transport parameter, and the carrier ranking; and provide a carrier selection as a function of the carrier optimization model and the identified carrier.

2. The system of claim 1, wherein the computing device is communicatively connected to a carrier network.

3. The system of claim 1, wherein the carrier optimization model includes an optimization criterion.

4. The system of claim 1, wherein the transport parameters include a transport component.

5. The system of claim 1, wherein the transport parameters include a destination.

6. The system of claim 1, wherein the carrier optimization model includes an objective function.

7. The system of claim 1, wherein the computing device is further configured to:

receive a user input;

generate a carrier optimization model as a function of the transport request and the user input; and provide a second carrier selection as a function of the user input.

8. The system of claim 1, wherein the computing device is further configured to update the carrier selection as a function of at least a second optimization criteria.

9. The system of claim 1, wherein a carrier is identified by a unique identification signal.

10. The system of claim 1, wherein the at least a transport path additionally comprises a geographic location of the at least a carrier configured to be updated in real time.

11. A method of carrier selection using a computing device, comprising:

receiving a transport request from an external computing device, wherein the transport request comprises transport request data conveyed to the computing device;

securing the transport request data by an immutable sequential listing;

receiving, from a carrier database, at least a carrier datum corresponding to at least a carrier of a plurality of carriers, wherein the at least a carrier datum comprises at least a transport path for the at least a carrier of the plurality of carriers comprising directions between a departure point and an arrival point;

generating a carrier optimization model as a function of the transport request, wherein the carrier optimization model minimizes a loss function by:

receiving training data, wherein the training data correlates a plurality of transport data to a carrier ranking;

training a first machine learning model as a function of the training data;

determining at least one transport parameter as a function of a first machine learning model, the first machine learning model configured to receive the transport request data as an input and output the at least one transport parameter; and ranking, as a function of a second machine learning model, a group of carriers, wherein the first machine learning model receives the transport request data and the at least one transport parameter determined as a function of the first machine learning model as an input and outputs a carrier ranking of each carrier of the group of carriers;

identifying a carrier of the plurality of carriers to complete the transport request as a function of the transport request, the determined transport parameter, and the carrier ranking; and providing a carrier selection as a function of the carrier optimization model and the identified carrier.

12. The method of claim 11, wherein the computing device is communicatively connected to a carrier network.

13. The method of claim 11, wherein the carrier optimization model includes an optimization criterion.

14. The method of claim 11, wherein the transport parameters include a transport component.

15. The method of claim 11, wherein the transport parameters include a destination.

16. The method of claim 11, wherein the carrier optimization model includes an objective function.

17. The method of claim 11, wherein the computing device is further configured to:

receive a user input;

generate a carrier optimization model as a function of the transport request and the user input; and provide a second carrier selection as a function of the user input.

18. The method of claim 11, wherein the computing device is further configured to update the carrier selection as a function of at least a second optimization criteria.

19. The method of claim 11, wherein a carrier is identified by a unique identification signal.

20. The method of claim 11, wherein the at least a transport path additionally comprises a geographic location of the at least a carrier configured to be updated in real time.

* * * * *